United States Patent [19]
Gebhard et al.

[11] 3,768,587
[45] Oct. 30, 1973

[54] ANTI-THEFT HOOD RELEASE

[75] Inventors: Harold C. Gebhard, Livonia; Victor E. Turashoff, Warren; Paul A. Westerdale, Riverview, all of Mich.

[73] Assignee: Ford Motor Company, Dearborn, Mich.

[22] Filed: Apr. 27, 1972

[21] Appl. No.: 248,225

[52] U.S. Cl. .................................. 180/114, 70/257
[51] Int. Cl. ........................................... B60r 25/00
[58] Field of Search.................... 180/111, 112, 113, 180/114; 70/240, 241, 252, 257

[56] References Cited
UNITED STATES PATENTS

| | | | |
|---|---|---|---|
| 1,747,092 | 2/1930 | Van Note | 70/240 |
| 1,598,572 | 8/1926 | Geraghty | 70/240 |
| 3,648,491 | 3/1972 | Kennard | 70/241 |
| 1,912,945 | 6/1933 | Leiva | 70/257 |
| 1,652,953 | 12/1927 | Patterson | 70/257 |

Primary Examiner—Kenneth H. Betts
Assistant Examiner—Jack D. Rubenstein
Attorney—Keith L. Zerschling et al.

[57] ABSTRACT

In combination, a Bowden cable having a movable element adapted to be coupled to a latch mechanism release lever for actuating the latch mechanism from a remote location and a locking mechanism for rendering the cable movable element inoperative to actuate the release lever. The locking mechanism comprises a housing through which the Bowden cable projects and through which a blocking rod is slidably guided for movement in a direction normal to the movement of the cable element. The blocking rod has a portion selectively engageable with an abutment on the movable cable element. Key operable means are coupled to the rod for shifting the latter in a direction to place its blocking portion in opposition to the cable element abutment to prevent movement of the cable element in latch mechanism release lever actuating direction.

5 Claims, 5 Drawing Figures

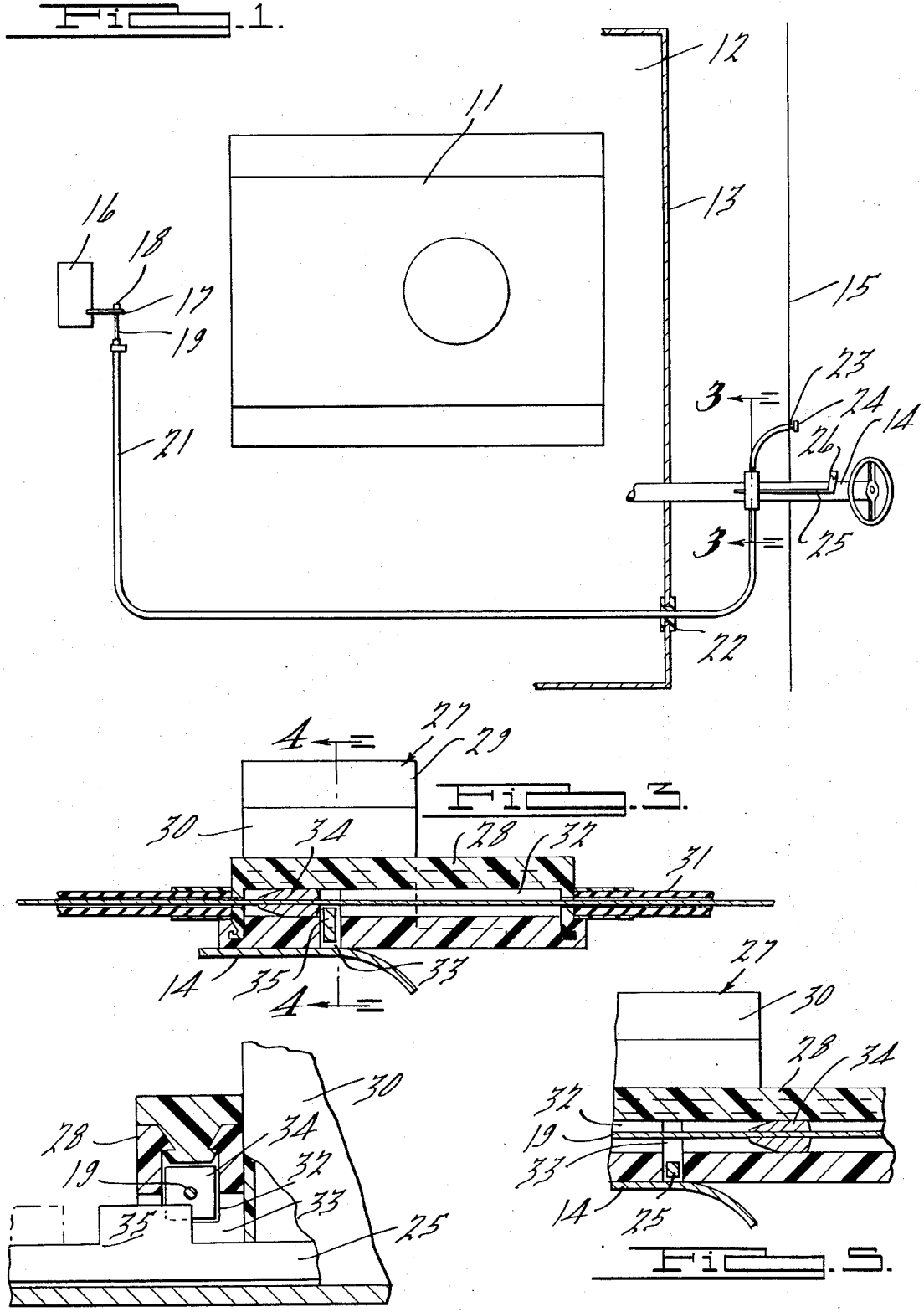

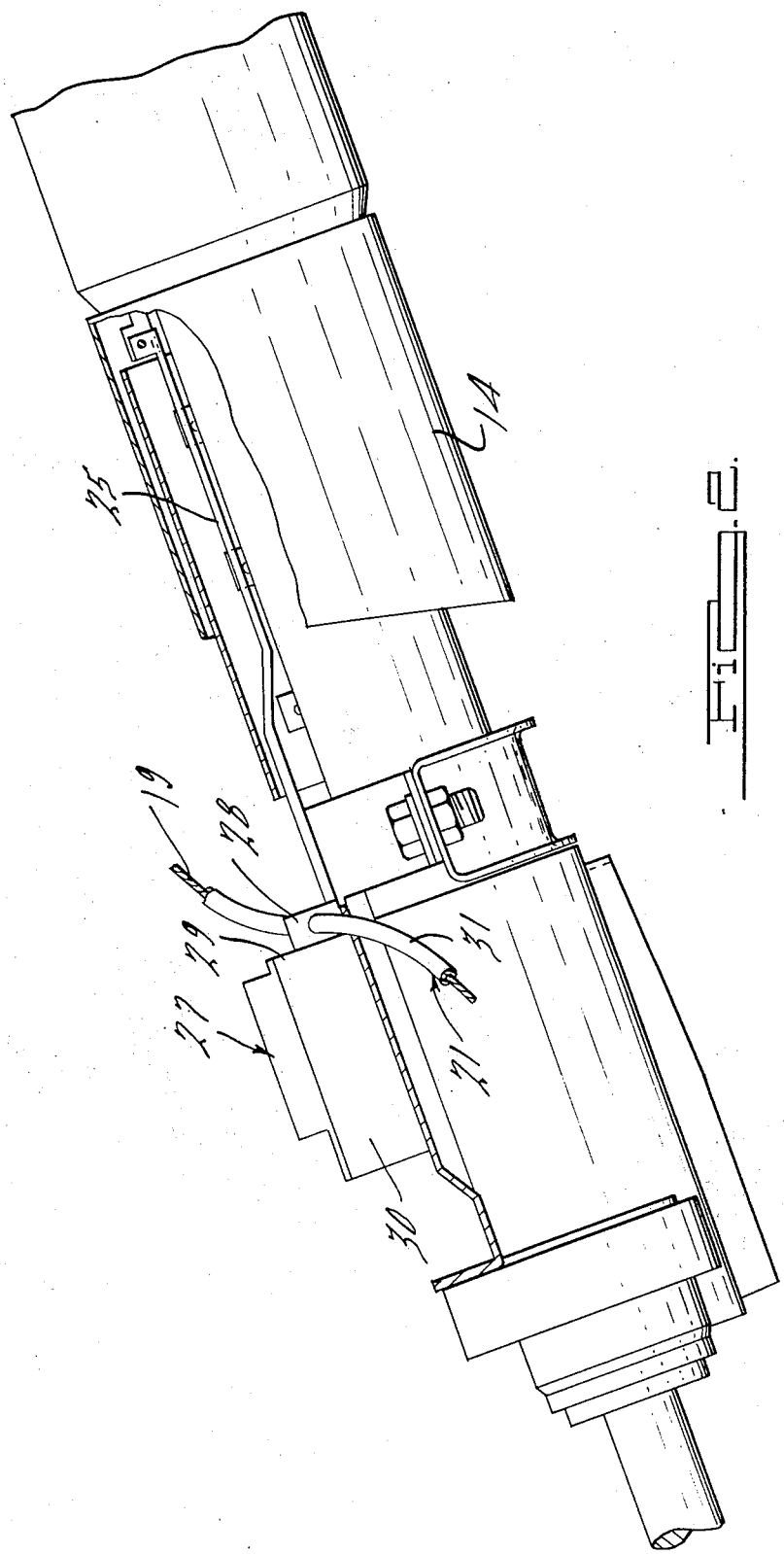

ANTI-THEFT HOOD RELEASE

BACKGROUND OF THE INVENTION

Bowden cable operated latch mechanisms for vehicle body closures, such as vehicle body engine compartment hoods or luggage compartment lids, are known in the prior art. It is also known to provide a key operated locking device for locking the movable element of the Bowden cable against manipulation to release the latch mechanism. Reference may be made to U.S. Pat. No. 3,572,790 issued Mar. 30, 1971 to Harley L. Kapanka for a recent disclosure of a Bowden cable latch mechanism release and a locking device for the cable.

In the prior art mechanisms, as exemplified by U.S. Pat. No. 3,572,790, the locking device is key operable by either a separate key or by an ignition lock key which must first be removed from the ignition lock before it can be used to unlock the hood latch release cable.

It is an object of the present invention to correlate the ignition lock system with a cable locking mechanism whereby the latter is in unlocked condition whenever the vehicle ignition is in an "on" or "accessory" condition.

SUMMARY OF THE INVENTION

The present invention comprises, in combination, a Bowden cable adapted to be coupled to a latch mechanism release lever and a locking mechanism for rendering the cable inoperative to actuate the release lever. The locking mechanism comprises a housing adapted to be mounted on a support member, preferably the steering column of a vehicle. The housing has an elongated recess through which the Bowden cable projects. A slug is secured to the cable within the recess and is slidably guided by walls of the recess. A blocking rod is slidably guided within the base member for movement in a direction normal to movement of the Bowden cable. The key operated means is operable to shift the rod in a direction to engage the cable mounted slug to prevent movement of the cable in latch mechanism release lever actuating direction.

More specifically, the blocking rod is an ignition switch activation rod that extends longitudinally of the steering column. The blocking rod is coupled at one of its ends to the key operated means and at its other end to an ignition switch. The rod has a slug engaging portion intermediate its ends positioned to engage the slug in ignition lock position of the ignition switch.

DESCRIPTION OF THE DRAWINGS

Further features and advantages of the present invention will be made more apparent as this description proceeds, reference being had to the accompanying drawings, wherein:

FIG. 1 is a schematic diagram of a vehicle engine compartment disclosing the relationship of the mechanisms embodying the present invention;

FIG. 2 is an enlarged side elevational view of a portion of the vehicle steering column shown in FIG. 1, the view being in part sectional;

FIG. 3 is an enlarged section view on the line 3—3 of FIG. 1;

FIG. 4 is an enlarged section view on the line 4—4 of FIG. 3; and

FIG. 5 is a fragmentary view in part similar to FIG. 3 illustrating parts of the mechanisms in a second relationship.

DETAILED DESCRIPTION OF THE INVENTION

Referring to FIG. 1, there is diagrammatically shown a vehicle engine 11 positioned within an engine compartment 12. The engine compartment is separated in the usual manner from a vehicle passenger compartment by a firewall or dash panel 13. The steering wheel column 14 projects through the wall 13 into the passenger compartment, the steering wheel column 14 in part projecting through or beneath the instrument panel designated by the line 15.

A conventional latch mechanism 16 is positioned at the front end of the engine compartment. The latch mechanism is adapted to have latching engagement with a keeper device (not shown) carried on an engine compartment closure or hood (not shown). The latch mechanism 16 has a release lever 17 to which one end 18 of the movable wire element 19 of a conventional Bowden wire or cable 21 is adapted to be coupled. The Bowden wire or cable 21 is routed within the engine compartment through a grommet 22 in the firewall or dash panel 13 and then over the steering column 14 to the instrument panel 15. The other end 23 of the movable wire element 19 is provided with a push-pull button 24.

Mounted on the upper surface and extending longitudinally of the steering column 14 is a vehicle ignition switch activation rod 25. The rod 25 extends between a conventional column mounted key-operated device 26 for locking the vehicle against operation and a multi-positioned switching device 27, see FIG. 2. Movement of the rod 25 longitudinally of the steering column 14 and the consequent effect on the switch contacts determines the mode of operation for the vehicle, i.e. whether or not the accessories are energized, and whether or not the electrical circuits are de-energized or in a vehicle run or start mode.

The present invention takes advantage of the movable rod 25 as follows:

An appendage or auxiliary housing 28 is mounted on one end 29 of the switch housing 30. The Bowden cable 21 is routed to pass through the auxiliary housing 28. As best seen in FIG. 3, the cable sheath 31 terminates at each end of the housing 28 so that only the movable wire element 19 is exposed within the longitudinal recess 32 of the housing 28.

It will be noted that the longitudinal recess 32 extends in a direction normal to the rod 25. The rod 25 is movable through the housing 28 in the slot 33 in communication with the recess 32.

The exposed portion of the movable wire element 19 carries a slug 34 of substantially square cross section, the slug 34 being slidably guided by the walls of the recess 32. The rod 25 is provided with a tab or abutment 35 movable across the path of the slug 34, for a purpose to be explained.

OPERATION

When the vehicle ignition is in locked condition, with or without the key in the column mounted key-operated mechanism 26, the tab 35 on the ignition switch activation rod 25 les in abutting relation to the slug 34 on the cable 19. Thus, the cable wire movable element 19 cannot be withdrawn in a direction to transmit release movement to the latch mechanism lever 17. Upon the key being turned to any other position in the conventional ignition switch lock such as the accessory position, the start position or the run position, the tab 35 on the rod 25 is out of the path of the slug 34 and the latter may be moved from the FIG. 3 position to the FIG. 5 position, a position corresponding to that in which the latch mechanism release lever 17 has been actuated to release the latch mechanism permitting opening movement of the engine compartment closure or hood.

It is to be understood that the invention is not limited to the exact construction illustrated and described above, but that various changes and modifications may be made without departing from the spirit and scope of the invention as defined by the following claims:

We claim:

1. In combination, a Bowden cable adapted to be coupled to a latch mechanism release lever and a locking mechanism for rendering the cable inoperative to actuate the release lever,
   the locking mechanism comprising a housing adapted to be mounted on a support member,
   the housing having an elongated recess through which the Bowden cable projects,
   a slug secured to the cable within the recess and slidably guided by walls of the recess,
   a blocking rod slidably guided within the housing for movement in a direction normal to movement of the Bowden cable,
   and key operated means operable to shift the rod in a direction to engage the cable mounted slug to prevent movement of the cable in latch mechanism release lever actuating direction.

2. In combination according to claim 1, in which:
   the housing is adapted to be mounted on the steering column of a vehicle.

3. In combination according to claim 2, in which:
   the blocking rod is an ignition switch activation rod extending longitudinally of the steering column,
   the blocking rod being coupled at one of its ends to the key operated means and at its other end to an ignition switch,
   the rod having a slug engaging portion intermediate its ends positioned to engage the slug in ignition locked position of the ignition switch.

4. A motor vehicle body comprising a passenger compartment,
   an end compartment separated from the passenger compartment by a wall therebetween,
   a steering wheel column at one end of the passenger compartment,
   a closure for the end compartment,
   a latch mechanism for latching the closure in closed position relative to the end compartment,
   the latch mechanism having a release lever,
   a Bowden cable passing through the wall and having its movable cable element coupled to the release lever for operating the latter to unlatch the latch mechanism,
   and a locking mechanism for rendering the movable cable element inoperative to actuate the release lever,
   characterized in that the locking mechanism comprises a housing mounted on the steering column,
   the housing having an elongated recess through which the Bowden cable projects,
   a slug secured to the movable cable element within the recess and slidably guided by walls of the recess,
   a blocking rod slidably guided within the housing for movement in direction normal to movement of the Bowden cable movable element,
   and key operated means on the steering column coupled to the blocking rod and operable to shift the rod in a direction to engage the cable mounted slug to prevent movement of the movable cable element in latch mechanism release lever actuating direction.

5. A motor vehicle body according to claim 4, characterized in that:
   the blocking rod extends longitudinally of the steering column,
   the rod being coupled at one end to the key operated means and at its other end to an ignition switch,
   the rod passing through the housing intermediate its ends and having on its intermediate portion a slug blocking portion positioned to engage the slug secured on the movable cable element to block latch releasing movement of the latter in ignition locked position of the ignition switch.

* * * * *